(12) United States Patent
Conrad et al.

(10) Patent No.: US 9,217,441 B2
(45) Date of Patent: Dec. 22, 2015

(54) PUMP SEAL WITH THERMAL RETRACTING ACTUATOR

(71) Applicant: Westinghouse Electric Company LLC, Cranberry Township, PA (US)

(72) Inventors: John W. Conrad, Butler, PA (US); Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 580 days.

(21) Appl. No.: 14/072,891

(22) Filed: Nov. 6, 2013

(65) Prior Publication Data

US 2015/0125271 A1 May 7, 2015

(51) Int. Cl.
| | |
|---|---|
| *F16J 15/16* | (2006.01) |
| *F04D 29/10* | (2006.01) |
| *F04D 29/12* | (2006.01) |
| *F04B 7/00* | (2006.01) |
| *F03G 7/06* | (2006.01) |
| *F04D 29/14* | (2006.01) |
| *F15B 15/14* | (2006.01) |
| *F16J 15/34* | (2006.01) |

(52) U.S. Cl.
CPC *F04D 29/10* (2013.01); *F03G 7/06* (2013.01); *F04B 7/00* (2013.01); *F04D 29/12* (2013.01); *F04D 29/146* (2013.01); *F15B 15/14* (2013.01); *F16J 15/164* (2013.01); *F16J 15/3448* (2013.01)

(58) Field of Classification Search
CPC .......... F03G 7/06; F16J 15/00; F16J 15/164; F16J 15/188; F16J 15/28; F16J 15/54; F16J 15/16; F16J 15/3448; F04D 29/12; F04D 29/14; F04D 29/122; F04D 29/126; F04D 29/10; F04D 29/146; F16C 33/7816; F04B 7/00; F15B 15/14

USPC ........ 277/542, 929, 471, 472, 473, 474, 467, 277/484, 486; 415/136, 230, 174.1
See application file for complete search history.

(56) References Cited

U.S. PATENT DOCUMENTS 3,035,841 A * 5/1962 Riester .................. F16J 15/008
277/348
3,347,552 A 10/1967 Frisch
(Continued)

FOREIGN PATENT DOCUMENTS

JP 2013151922 A 8/2013

OTHER PUBLICATIONS

Hawkins, P. J., "Pump Seal With Thermal Retracting Actuator," U.S. Appl. No. 13/970,899, filed Aug. 20, 2013, 42 pages.
(Continued)

*Primary Examiner* — Devon Kramer
*Assistant Examiner* — Nathan Zollinger
(74) *Attorney, Agent, or Firm* — Joseph C. Spadacene; Westinghouse Electric Company LLC

(57) ABSTRACT

A thermal actuator for a rotating shaft shutdown seal that has a piston with a portion of its axial length enclosed within a cylinder shell with a material, such as a fusible link that changes state or deforms above a given temperature, interposed between a closed end of the cylinder and one end of the piston. The piston is spring biased toward the material and moves toward the closed end of the cylinder when the given temperature is reached and the deformation or change of state of the material makes room for the piston to move toward the closed end. Movement of the piston is transferred through a piston rod to activate the seal.

14 Claims, 7 Drawing Sheets

(56) References Cited

U.S. PATENT DOCUMENTS

| | | | |
|---|---|---|---|
| 3,522,948 A | | 8/1970 | MacCrum |
| 3,529,838 A | | 9/1970 | Singleton |
| 3,632,117 A | | 1/1972 | Villasor |
| 3,720,222 A | | 3/1973 | Andrews et al. |
| 4,202,553 A | * | 5/1980 | Kropp ............... F16J 15/54 277/366 |
| 4,275,891 A | | 6/1981 | Boes |
| 5,217,232 A | * | 6/1993 | Makhobey ......... F16J 15/164 277/411 |
| 5,511,576 A | | 4/1996 | Borland |
| 6,371,488 B1 | * | 4/2002 | Szymborski ........ F04D 29/126 277/358 |
| 8,356,972 B2 | | 1/2013 | Howard et al. |
| 2007/0140877 A1 | | 6/2007 | Sanville et al. |
| 2013/0170594 A1 | | 7/2013 | Bass et al. |
| 2014/0271288 A1 | * | 9/2014 | Hawkins ............ F04D 7/08 417/423.11 |
| 2014/0271294 A1 | * | 9/2014 | Hawkins ............ F04B 7/00 417/510 |
| 2015/0108721 A1 | * | 4/2015 | Thuillier ........... F16J 15/008 277/522 |

OTHER PUBLICATIONS

Silicones, Inc., "RTV silicon rubber compounds, catalyst addition cure and con . . . ," web page, Oct. 21, 2013, 1 page.

International Search Report and Written Opinion of the International Searching Authority for PCT/US2014/041214 dated Nov. 26, 2014 (Forms PCT/ISA/220, PCT/ISA/210, PCT/ISA/237).

* cited by examiner

PUMP SEAL WITH THERMAL RETRACTING ACTUATOR

CROSS REFERENCE TO RELATED APPLICATION

This application is related to application Ser. No. 13/970,899, filed Aug. 20, 2013, entitled "Pump Seal With Thermal Retracting Actuator."

BACKGROUND

1. Field

This invention pertains generally to rotary shaft seals and, more particularly to a thermally actuated seal for a centrifugal pump and in particular to a new thermal actuator for such a seal.

2. Related Art

In pressurized water nuclear power plants a reactor coolant system is used to transport heat from the reactor core to steam generators for the production of steam. The steam is then used to drive a turbine generator for the production of useful work. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example, 550° F. (280° C.) and at pressures of approximately 2,250 psia (155 bar). The pump basically includes three general sections from bottom to top; hydraulic, shaft seal and motor sections. The lower hydraulic section includes an impeller mounted on a lower end of the pump shaft which is operable within the pump casing to pump reactor coolant about the respective loop. The upper motor section includes a motor which is coupled to drive the pump shaft. The middle shaft seal section includes three tandem seal assemblies; lower primary (number 1 seal), middle secondary, and upper tertiary seal assemblies. The seal assemblies are located concentric to, and near the top end of, the pump shaft and their combined purpose is to provide for minimal reactor coolant leakage along the pump shaft to the containment atmosphere during normal operating conditions. Representative examples of pump shaft seal assemblies known in the prior art are described in U.S. Pat. Nos. 3,522,948; 3,529,838; 3,632,117; 3,720,222 and 4,275,891.

The pump shaft seal assemblies which mechanically seal the interface between the stationary pump pressure boundary and the rotating shaft, must be capable of containing the high system pressure (approximately 2,250 psi (155 bar)) without excessive leakage. The tandem arrangement of three seal assemblies is used to break down the pressure in stages. These three mechanical pump seal assemblies are controlled leakage seals which, in operation, allow a minimal amount of controlled leakage at each stage while preventing excessive leakage of the reactor coolant from the primary coolant system to the respective seal leakoff ports.

The pump seal assemblies are normally maintained at temperatures well below those of the primary coolant system, either through the injection of cool fluid at the seal assemblies or through the use of a heat exchanger which cools the primary fluid before it reaches the seal assemblies. Theorized failure of these systems may expose the seal assemblies to high temperatures which will likely cause the controlled leakage of the seal assemblies to increase dramatically. When the cause of the loss of all nuclear fuel cooling in the reactor core is due to losing all AC power, the seal leakoff has no means of returning to the coolant system without electricity to power the makeup pumps. Controlled leakage without the means of makeup could hypothetically lead to reactor coolant uncovering the reactor core and subsequent core damage.

Consequently, a need exists for an effective way to back up the standard seal assemblies in the event of a coincidental loss of all fuel cooling and loss of makeup pumping. Preferably, such a back up seal should be operable upon loss of power or other cause for the loss of makeup pumping capacity to substantially seal the shaft from leakage.

SUMMARY

The foregoing objectives are achieved, in accordance with this invention, by a thermally actuated shutdown seal for a shaft of reduced speed or stopped rotating equipment such as a pump, compressor or the like, that is designed to restrict the normal leakage of coolant through a shaft seal. The shutdown seal claimed hereafter is useful for sealing any equipment having a narrow flow annulus between its shaft and housing.

The shutdown seal is characterized by a "split ring" that is designed (i) to surround the shaft with an annulus therebetween during normal operation and (ii) to constrict against the shaft when the shaft slows below a predetermined speed or stops rotating. The split ring has confronting ends that are maintained in spaced relationship by a spacer when the shaft is rotating during normal online operation. When the shaft slows or stops rotating and the temperature in the housing rises, the spacer is removed from the confronting ends of the split ring and the split ring constricts against the shaft as the confronting ends of the split ring approach each other, which blocks a substantial portion of the leakage of coolant through the annulus.

Preferably, the shutdown seal also has a pliable polymer seal ring which is urged against the shaft by an increase in pressure in the housing when the split ring blocks the leakage of coolant through the annulus.

In particular, this invention provides such a seal with an improved actuator for removing the spacer from between the confronting ends of the split ring when the liquid in the annulus rises above a preselected temperature so the split ring can constrict to narrow or substantially seal the portion of the annulus covered by the split ring. The actuator includes a cylinder having an axial dimension with a piston axially moveable within the cylinder with the cylinder having an upper and lower end which is sealed around the piston. A piston rod extends at a lower end of the piston through a lower opening in the cylinder and has one end of the piston rod connected to the space. A cavity occupies a space within an upper portion of the cylinder between the piston and an upper end of the cylinder when the spacer is disposed between the confronting ends of the split ring. A fusible link occupies at least some of the space within the cavity between the piston and the upper end of the cavity. The fusible link is selected to deform or change state at a preselected temperature to enable the piston to move into the cavity. A spring is interposed between a lower end of the piston and the lower end of the cylinder, biasing the piston against the fusible link. The actuator assembly is structured to move the piston toward the upper end of the cylinder upon the change of state or defamation of the fusible link to remove the spacer from between the confronting ends of the split ring.

In one embodiment, the spring is a wave spring. Preferably, the wave spring comprises a number of leaves which are aligned in tandem so their high and low points respectively aligned. The spring is substantially in a compressed condition when the spacer is substantially positioned between the confronting ends of the split ring.

In still another embodiment, the piston rod has a reduced diameter within the vicinity of the opening in the cylinder at the position of the piston rod confronting the opening at a time just prior to start of movement of the piston into the cavity. Preferably, the fusible link is made substantially of a material having a melting point approximately between 280° F. (138° C.) and 390° F. (198° C.).

The invention also contemplates a shutdown seal and an actuator employing the above concepts.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
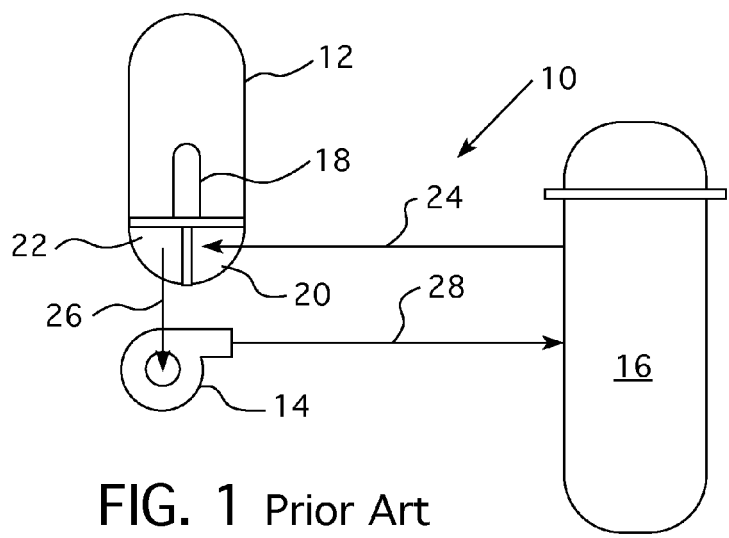
FIG. 1 is a schematic representation of one cooling loop of a conventional nuclear reactor cooling system which includes a steam generator and reactor coolant pump connected in series in a closed loop system with the reactor.

In the following description, like reference characters designate like or corresponding parts throughout the several view. Also, in the following description, it should be understood that such terms of direction as "forward," "rearward," "left," "right," "upwardly," "downwardly," and the like, are words of convenience and are not to be construed as limiting terms.

Prior Art Reactor Cooling Pump

To understand the invention, it is helpful to understand one environment in which the invention will operate. However, it should be appreciated that the invention has many other applications. Referring to FIG. 1, there is shown a schematic representation of one of a plurality of reactor coolant loops 10 of a conventional nuclear reactor coolant system. The coolant loop 10 includes a steam generator 12 and reactor coolant pump 14 connected in series in a closed loop coolant system with the nuclear reactor core 16. The steam generator 12 includes primary heat exchange tubes 18 communicating with inlet and outlet plenums 20, 22 of the steam generator 12. The inlet plenum 20 of the steam generator 12 is connected in flow communication with the outlet of the reactor core 16 for receiving hot coolant therefrom along flow path 24, commonly referred to as the hot leg of the closed loop system. The outlet plenum 22 of the steam generator 12 is connected in flow communication with an inlet section side of the reactor coolant pump 14 along flow paths 26 of the closed loop system. The outlet pressure side of the reactor coolant pump 14 is connected in flow communication with the inlet of the reactor core 16 for feeding relatively cold coolant thereto along flow path 28 of the cold leg of the closed loop system.

The coolant pump 14 pumps the coolant under high pressure about the closed loop system. Particularly, hot coolant emanating from the reactor core 16 is conducted to the inlet plenum 20 of the steam generator 12 and through the heat exchange tubes 18 in communication therewith. While in the heat exchange tubes 18, the hot coolant flows in heat exchange relationship with cool feedwater supplied to the steam generator 12 via a conventional means (not shown). The feedwater is heated and portions thereof are changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed loop system. Although the temperature of the coolant flowing from the steam generator 12 through the pump 14 as a result of the heat exchange has been cooled substantially below the temperature of the coolant flowing to the steam generator 12 from the reactor 16 before heat exchange, its temperature is still relatively high being typically about 550° F. (288° C.). To maintain the coolant in a liquid state at these relatively high temperatures, the system is pressurized by injection pumps (not shown) and operates at pressures that are approximately 2,250 psia (155 bar).

Figure 2:
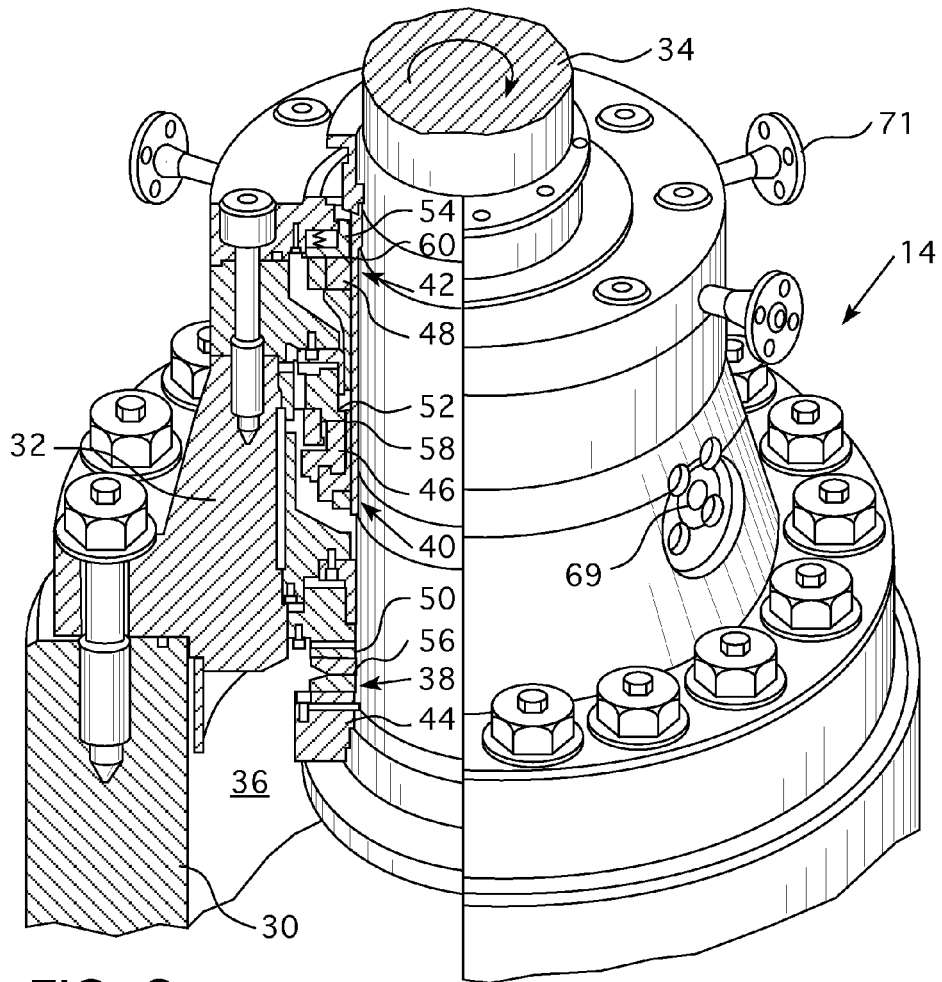
FIG. 2 is a cutaway perspective view of the shaft seal section of a reactor coolant pump, illustrating in cross section the seal housing and the lower primary, middle secondary, and upper tertiary seal assemblies which are disposed within the seal housing and surround the pump shaft.
Figure 3:
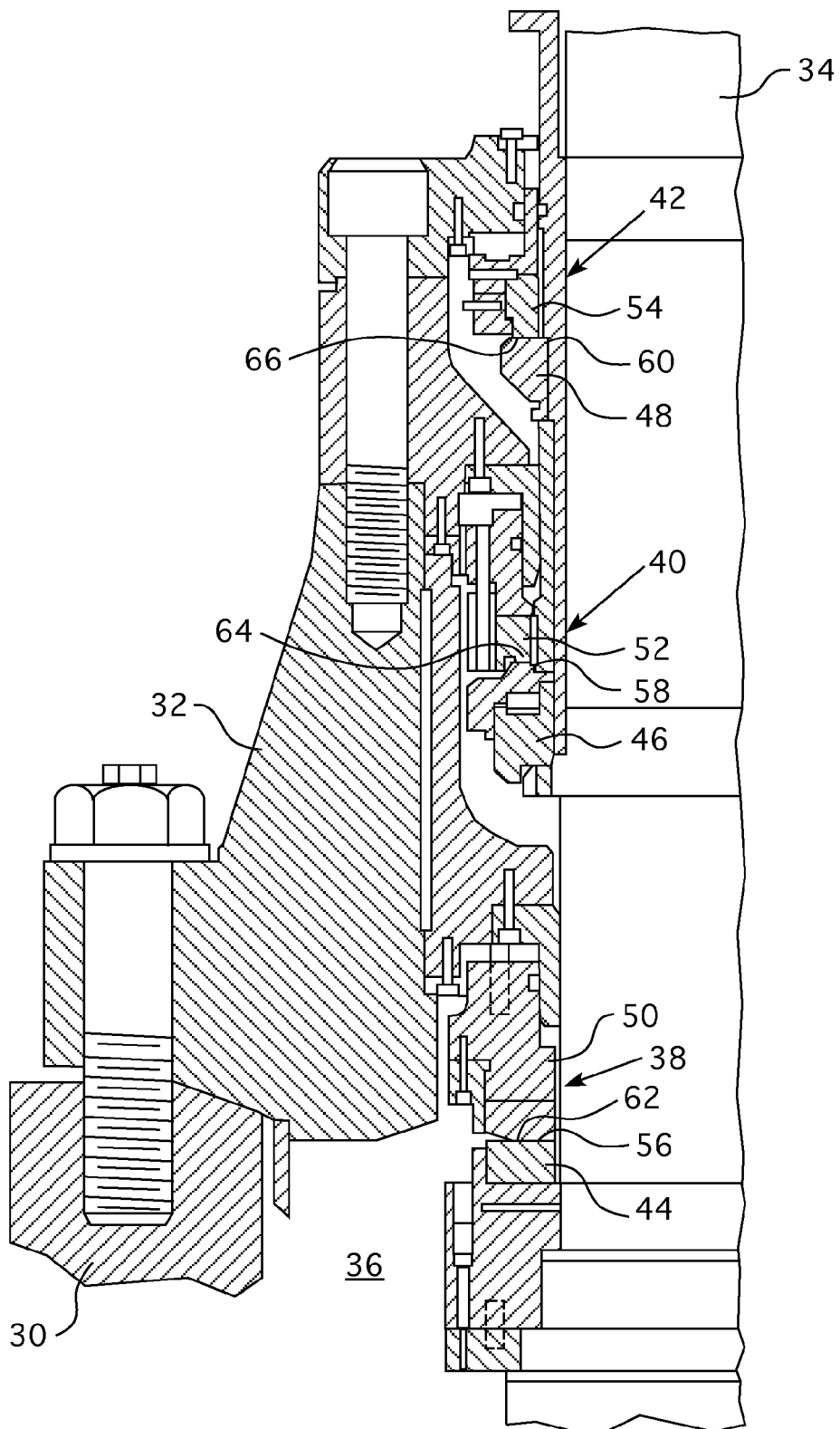
FIG. 3 is an enlarged cross sectional view of a portion of the seal housing and seal assemblies of the reactor coolant pump of FIG. 2.

As seen in FIGS. 2 and 3, the prior art reactor coolant pump 14 generally includes a pump housing 30 which terminates at one end in a seal housing 32. The pump also includes a pump shaft 34 extending centrally of the pump housing 30 and being sealed and rotatably mounted within the seal housing 32. Although not shown, the bottom portion of the pump shaft 34 is connected to an impeller, while a top portion thereof is connected to a high horsepower, induction type electric motor. When the motor rotates the shaft 34, the impeller within the interior 36 of the pump housing 30 causes the pressurized reactor coolant to flow through the reactor coolant system. This pressurized coolant applies an upwardly directed hydrostatic load upon the shaft 34 since the outer portion of the seal housing 32 is surrounded by the ambient atmosphere.

In order that the pump shaft 34 might rotate freely within the seal housing 32 while maintaining the 2,250 psia (155 bar) pressure boundary between the pump housing interior 36 and the outside of the seal housing 32, tandemly arranged lower primary, middle secondary and upper tertiary seal assemblies 38, 40, 42 are provided in the positions illustrated in FIGS. 2 and 3 about the pump shaft 34 within the seal housing 32. The lower primary seal 38 which performs most of the pressure sealing (approximately 2,200 psi (152 bar)) is of the noncontacting hydrostatic type, whereas the middle secondary and upper tertiary seal assemblies 40, 42 are of the contacting or rubbing mechanical type.

Each of the seal assemblies 38, 40, 42 of the pump 14 generally includes a respective annular runner 44, 46, 48 which is mounted to the pump shaft 34 for rotation therewith and a respective annular seal ring 50, 52, 54 which is fixedly mounted within the seal housing 32. The respective runners 44, 46, 48 and the seal rings 50, 52, 54 have top and bottom surfaces 56, 58, 60 and 62, 64, 66 which face one another. The facing surfaces 56, 62 of the runner 44 and seal ring 50 of the lower primary sealing assembly 38 normally do not contact one another but instead a film of fluid normally flows between them. On the other hand, the face surfaces 58, 64 and 60, 66 of the runners and seal rings 46, 52 and 48, 54 of the middle secondary and upper tertiary seal assemblies 40 and 42 normally contact or rub against one another.

Because the primary sealing assembly 38 normally operates in a film-riding mode, some provision must be made for handling cooling fluid which "leaks off" in the annular space between the seal housing 32 and the shaft 34 rotatably mounted thereto. Accordingly, the seal housing 32 includes a primary leakoff port 69, whereas leakoff ports 71 accommodate coolant fluid leakoff from the secondary and tertiary seal assemblies 40, 42.

Figure 4:
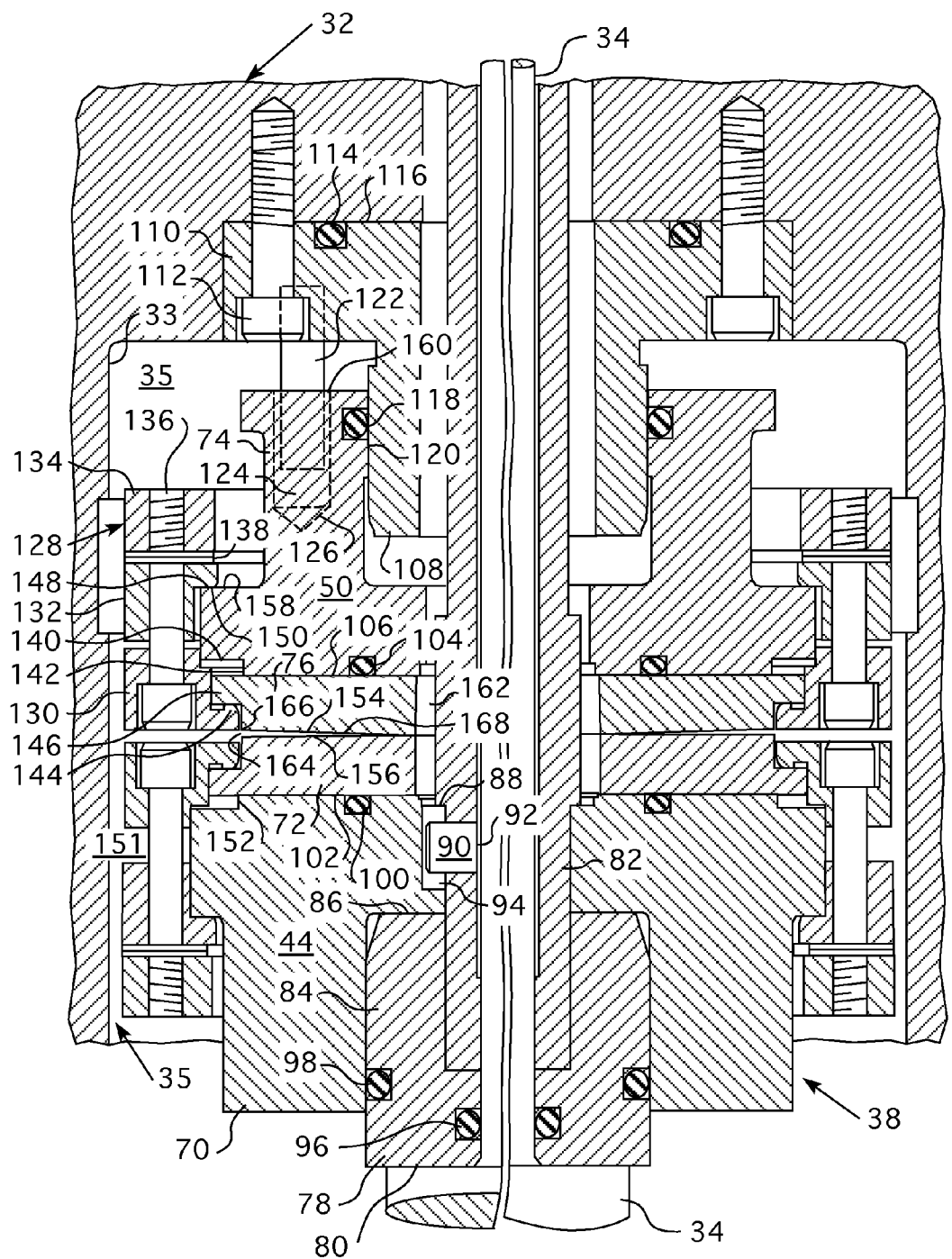
FIG. 4 is a sectional view of the shaft seal arrangement showing an enlarged view of the lower primary seal shown in FIGS. 2 and 3, to which this invention may be applied.

FIG. 4 is a cross section of the seal housing in the area of the number 1 or primary lower seal of the type illustrated in FIGS. 2 and 3 and provides a better understanding of the operation of the number 1 seal and how it will interface with this invention. The structure shown comprises a housing 32 having annular wall 33 adapted to form a pressure chamber 35 within the housing 32; a shaft 34 rotatably mounted within the housing 32; a seal runner assembly 44 and a seal ring assembly 50 disposed within the housing 32. As previously mentioned, the shaft 34 may be driven by a suitable motor (not shown) and utilized to drive the impeller of a centrifugal pump (not shown) which circulates the coolant in the pressurized system. Injection water may be supplied to the chamber 35 at a higher pressure than that developed by the pump. The runner assembly 44 comprises an annular holder 70 and an annular seal plate 72. Similarly, the seal ring assembly 50 comprises a holder 74 and an annular face plate 76.

The holder 70 rotates with the shaft 34 since it is mounted on an annular support 78 which engages a shoulder 80 on the shaft 34 and is secured to the shaft by means of a sleeve 82 which is assembled onto the shaft 34 between the shaft and an upwardly extending leg 84 of the support 78 which is generally L-shaped in cross section. It should be appreciated that although this embodiment of the invention is being described as applied to a pump that employs a sleeve over the pump shaft, the invention can be employed equally as well on pump shafts that do not employ sleeves. A shoulder 86 on the holder 70 rests on the upper end of the leg 84, and a shoulder 88 on the sleeve 82 retains the holder 70 on the support 84. A pin 90 is pressed into a recess 92 in the sleeve 82 and engages an axial slot 94 in the holder 70. An axial clamping force is exerted on the sleeve 82 and the support 78 from a nut (not shown) which causes the sleeve 82 and the support 78 to rotate with the shaft 34. The pin 90, in turn, causes the holder 70 to rotate with the sleeve 82 which rotates with the shaft 34. O-ring seals 96 and 98 are provided between the support 78 and the shaft 34 and the holder 70, respectively. An O-ring seal 100 is also provided in the interface 102 between the holder 70 and the face plate 72.

The face plate 72 is composed of a corrosion and erosion resistant material having substantially the same coefficient of thermal expansion as the material of which the holder 70 is composed, and the holder 70 has a high elastic modulus. Similarly, the face plate 76 is composed of a corrosion and erosion resistant material having substantially the same coefficient of thermal expansion as the material of the holder 74 which has a high elastic modulus. Examples of suitable materials are carbides and ceramics. An O-ring seal 104 is provided in the interface 106 between the holder 74 and the face plate 76.

The holder 74 is movably mounted on a downwardly extending leg 108 of an annular seal ring insert 110 which is generally L-shaped in cross section. The insert 110 is retained in the housing 32 by cap screws 112. An O-ring seal 114 is provided in the interface between the insert 110 and the housing 32. Similarly, O-ring seal 118 is provided in the interface 120 between the holder 74 and the leg 108 of the insert 110. Rotative movement of the holder 74 is prevented by the pin 122 which is pressed into the insert 110. The pin 122 extends into a well 124 in the holder 74 with sufficient clearance between the wall of the well 126 and the pin 122 to permit axial movement of the holder 74 but limit rotative movement of the holder 74.

The face plate 76 is attached to the holder 74 by clamping means 128 which includes a retainer ring 130, a clamp ring 132, a lock ring 134, a plurality of cap screws 136 and belleville springs 138 mounted on the cap screw 136 between the lock ring 134 and the clamp ring 132. The cap screws 136 extend through the retainer ring 130, the clamp ring 132, the belleville springs 138 and are threaded into the lock rings 134. The interface 106 of the holder 74 is recessed at 140 to provide an annular fulcrum 142 on the interface at an outside diameter which is less than the outside diameter of the interface of the face plate 76. The retainer ring 130 has an inwardly extending flange with a ridge 144 which engages the portion 146 of the face plate 76 extending beyond the fulcrum 142. The clamp ring 132 has an inwardly extending flange with a ridge 148 which engages a face plate 150 on the holder 74. Thus, when the cap screws 136 are tightened to draw the clamp ring 132 and the retainer ring 130 towards each other, a force is produced which exerts a cantilever effect on the face plate 76 about the fulcrum 142. During the clamping action, the belleville springs 138 are partly compressed and the face plate 76 is deformed by the clamping force.

The face plate 72 is attached to the holder 70 by a clamping means 151 in a manner similar to that described with reference to the face plate 76. However, the fulcrum 152 on the interface 102 of the holder 70 is located closer to the outside diameter of the face plate 72 than is the fulcrum 142 on the holder 74. Thus, the clamping force on the face plate 72 does not produce as much deformation of the face plate about the fulcrum 152 as is produced on the face plate 76. If desired, the fulcrums 142 and 152 may be placed at the same locations with respect to their corresponding face plates.

As previously described, the seal ring 50 is mounted for limited axial movement relative the shaft 34 and the seal runner assembly 44. Also, rotative movement of the seal ring assembly 50 is limited by the anti-rotational pin 122 which fits loosely in the well 124 in the seal ring holder 74. A seal face 154 on the face plate 76 is biased toward the confronting seal face 156 on the face plate 72 by gravity.

In operation of the pump driven by the shaft 34, surfaces 158 and 160 of the seal ring holder 74 are subjected to the full pressure in the high pressure chamber 35. It is desirable to provide a pressure barrier between the high pressure chamber 35 and an annular low pressure region 162 adjacent the sleeve 82. The seal ring assembly is utilized as the pressure barrier means, but permits a controlled amount of fluid leakage flow to the region 162 from the pressure chamber 35 through a seal gap 164 provided between the confronting seal surfaces 154 and 156 on the seal plate 76 and 72, respectively.

During operation, a balanced or equilibrium position of the axially moveable seal ring assembly 50 is maintained in accordance with the pressure on opposing faces of the seal ring assembly. The thickness of the fluid in the gap 164 and, consequently, the amount of leakage flow through the gap 164 is determined by the configuration of the gap 164.

In order to obtain a self-restoration of the relative position of the seal ring assembly 50 and the runner assembly 44 upon a variation in the seal gap 164, a fluid flow path of decreasing thickness is provided from a high pressure edge or extremity 166 to a position between the seal faced extremities. More specifically, in the structure illustrated, the fluid flow path of decreasing thickness extends between the outer edge 166 and an intermediate concentric circle located at 168 on the sealing face 154.

As shown in the present structure, the decreasing flow path thickness is formed by tapering the surface 154 slightly away from the confronting surface 156 of the face plate 72 between the circle 168 and the outer edge 166 of the face plate 76. The angle between the surfaces 154 and 156 shown in the drawing is exaggerated. This configuration or structure is known as a tapered-face seal. The operation of a seal of this type is fully described in U.S. Pat. No. 3,347,552, issued Oct. 17, 1967 to Erling Frisch.

Figure 5:
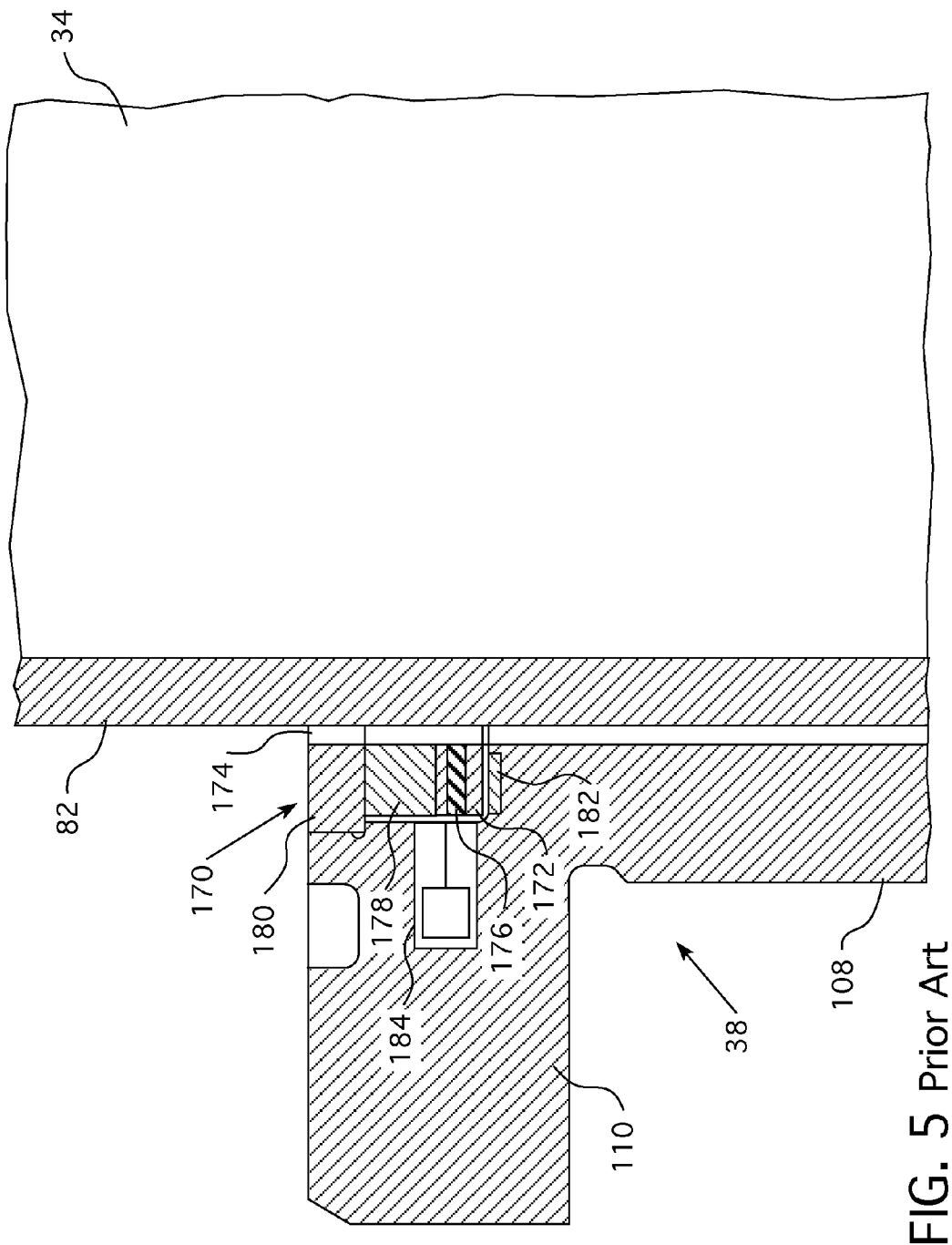
FIG. 5 is an enlarged portion of the insert of a primary seal shown in FIG. 4 with a portion of the pump shaft and a shutdown seal hatched with the shutdown seal shown as employing a thermally actuated mechanical piston to remove the spacer from the split ring.
Figure 6:
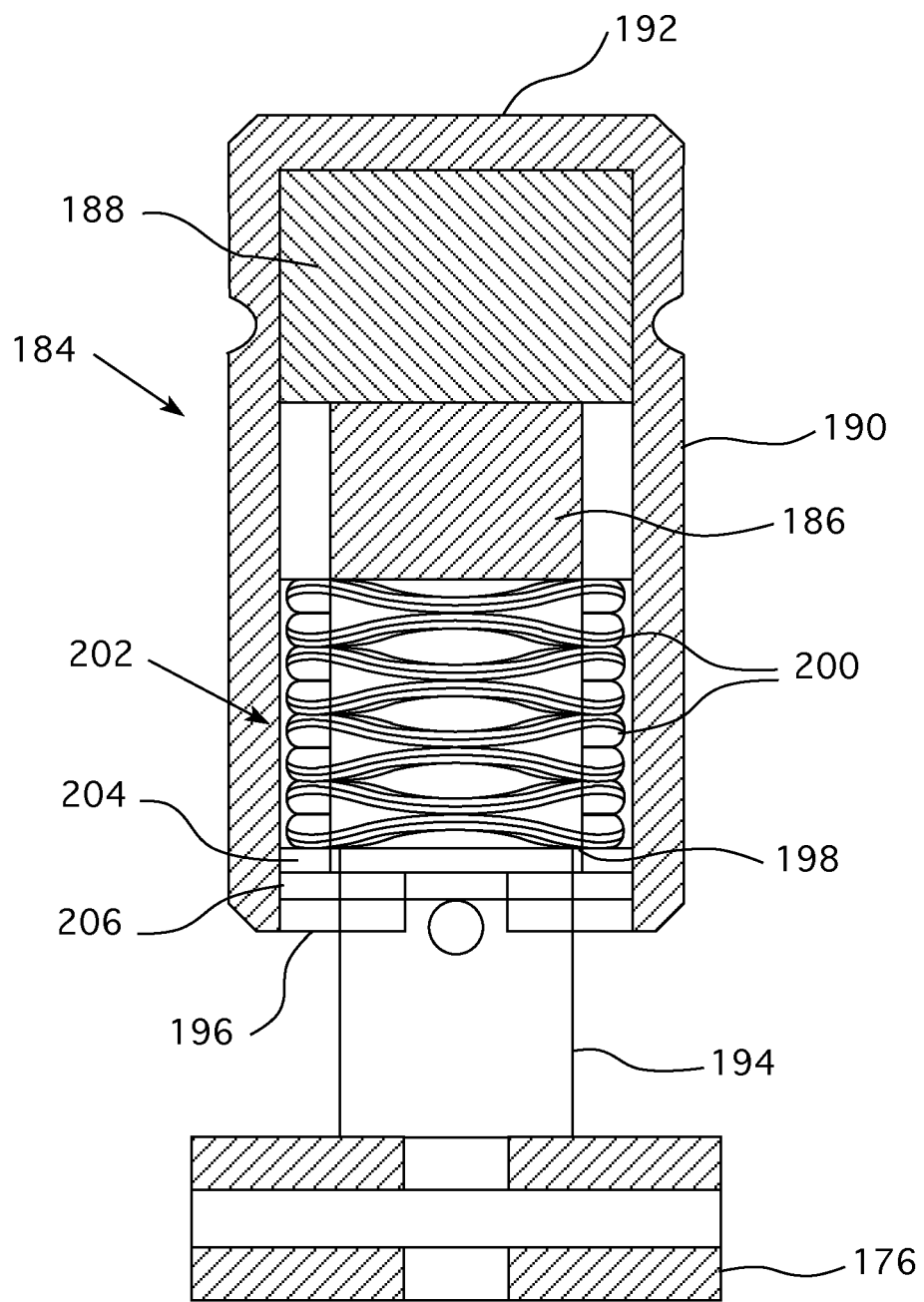
FIG. 6 is an enlarged sectional side view of one embodiment of an actuator that employs the principles claimed hereafter that replaces the actuator shown in FIG. 5.
Figure 7:
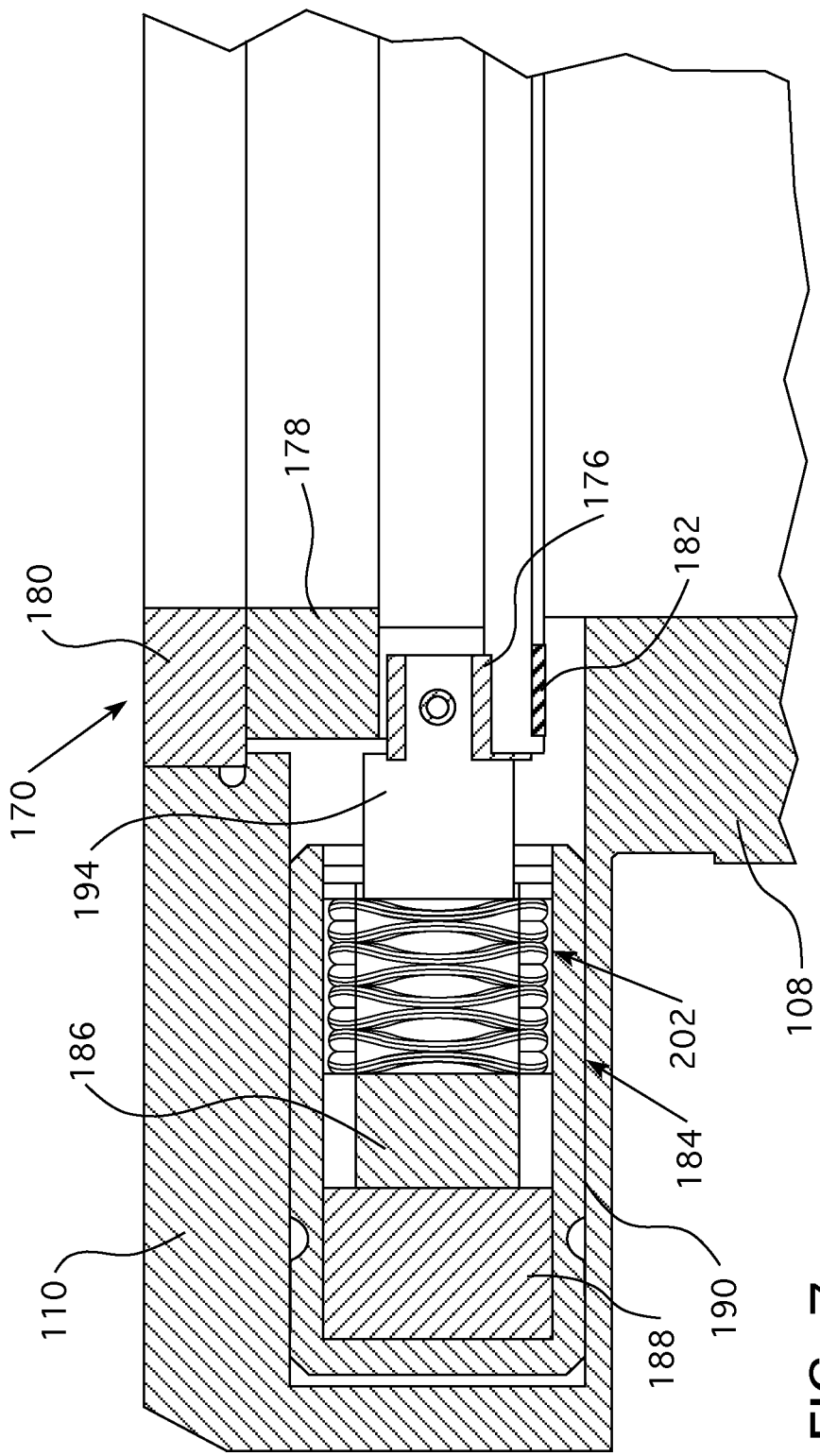
FIG. 7 is a longitudinal cross-sectional view of the embodiment shown in FIG. 6 supported within a seal housing.

The current shutdown seal is fully described in U.S. Pat. No. 8,356,972, issued Jan. 22, 2013 and assigned to the Assignee of this invention. The shutdown seal, described in that patent is illustrated in FIGS. 5-7 and provides an additional seal 170 in the pump 14 as a backup safety or shutdown device which is actuatable to prevent excessive leakage along the shaft 34 between it and the seal assemblies 38, 40, 42 of the pump in the event of a loss of seal cooling. As shown in FIG. 5, the shutdown seal 170 is situated in a machined groove in the annular opening in the insert 110 of the primary number 1 seal 38. The shutdown seal is characterized by a "split ring" 172 that is designed (i) to surround the shaft 34 with an annulus 174 therebetween during normal operation and (ii) to constrict against the shaft 34 when the shaft significantly slows or stops rotating after a loss of seal cooling. The split ring 172 is a single piece discontinuous ring member that is split axially and the confronting ends are maintained in a spaced relationship by a spacer 176 during normal pump operation. In FIG. 5, the opposing ends of the split ring 172 are machined in a tongue-and-groove configuration so that the tongue can ride in the groove as the ends of the split ring overlap. In another embodiment, the opposing ends may be butt ended or have a mitered half lap joint so the ends overlap. The spacer 176 is shown in the gap to keep the opposing ends of the split ring 172 from closing on the shaft 34 to maintain the annulus 174 opened for controlled leakage during operation. In accordance with the embodiment illustrated in FIG. 5, the shutdown seal is activated when the temperature of the seal rises as a result of a loss of cooling and preferably rotation as the pump shaft is slowed or stopped. The spacer is responsive to the rise in temperature (either because the shaft has significantly slowed or stopped rotating or for any other reason) to be removed from the confronting ends of the split ring 172. This causes the confronting ends of the split ring to constrict against the shaft 34 as the confronting ends of the split ring approach each other, which blocks the leakage of coolant through the flow annulus 174. Preferably, the split ring and shaft (or shaft sleeve where a sleeve is employed over the shaft) are constructed from gall resistant materials, so that if actuated on a rotating shaft gall balls will not be created which would otherwise serve as a wedge to open a leak path between the sealing surfaces. Materials such as 17-4 stainless for both the split ring and the shaft have proven to work well. A pliable polymer seal ring 178 is preferably situated around the shaft 34 against the split ring 172 between the split ring and a solid retaining seat ring 180. The pliable polymer seal ring 178 is urged against the shaft by an increase in pressure in the housing when the split ring restricts the leakage of coolant through the annulus 174, thus forming a tight seal.

FIG. 5 schematically depicts a shutdown seal 170 of the type described above installed in the reactor coolant pump of FIG. 4. The shutdown seal of FIG. 5 is designed to activate after a loss of seal cooling when the pump shaft 34 slows or is not rotating. The shutdown seal is located within the pump housing, encircling the shaft 34. In the case of the type of reactor coolant pump illustrated in FIGS. 2-4, the number 1 seal insert may be modified to accommodate the shutdown seal by machining out a portion of the inner diameter at the top flange. Until activated, the shutdown seal 170 is substantially completely contained within the space once taken up by the number 1 insert prior to modification, thus substantially unaltering the annulus 174 between it and the shaft 34. In this way, coolant flow through the annulus 174 along the shaft 34 is not substantially impeded during normal operation of the rotating equipment.

FIG. 5 shows a shutdown seal 170 made up of a retractable spacer 176 holding the confronting ends of the split ring 172 open. The retractable spacer 172 is activated by a thermally responsive mechanical device 184, such as the piston 186 described hereafter with regard to FIG. 6. When the spacer 176 is retracted from the ends of the split ring 172, the split ring 172 snaps shut, constricting around the shaft 34, while also remaining retained in the modified number 1 seal insert 110. The split ring 172 sits on a wave spring 182 that forces the split ring 172 up against the seal 178 which pushes against the retaining ring 180. The pressure drop caused by the interruption of the flow through the annulus 174 also forces the split ring 172 and seal ring 178 upwards, ensuring a tight seal between all of the sealing surfaces. The split ring 172 sits on a wave spring 182 that forces the split ring 172 up against the primary sealing ring 178 to ensure an initial sealing contact so the pressure drop across the split ring 172 is also acting on the primary sealing ring 178.

FIGS. 6 and 7 show one embodiment of the actuator of this invention which simplifies its construction and adds to its reliability over an extended period, e.g., nine years. FIG. 6 shows a cross-section of the actuator and FIG. 7 shows the embodiment shown in FIG. 6 supported within a cross-section of a portion of the seal housing. Like the previous actuators described in application Ser. No. 13/970,899, this embodiment employs a cylindrical housing 190 that is sealed at one end 192 with an opening at the opposite end through which a piston rod 194 can traverse. One end of the piston rod is connected to a spacer 176 and withdraws the spacer from between the confronting ends of the split ring as the piston rod 194 is withdrawn within the housing 190. The piston rod 194 is connected to a piston head 186 at its opposite end with a fusible link 188 interposed between the piston head 186 and the closed end of the housing 192. In this embodiment, the fusible link is constructed from a material that is selected due to its ability to melt at a preselected temperature, e.g., a melting point approximately between 280° F. (138° C.) and 390° F. (198° C.), such as a metal formed from a Bi/Sn alloy or a Sn/Zn alloy. A spring 202, such as a wave spring, and more preferably a plurality of wave spring leafs 200 that are stacked vertically and aligned in tandem between the lower part of the housing 190 and the piston head 186 so that the spring is in a compressed condition when the spacer 176 is between the confronting ends of the split ring. In that condition the spring biases the piston head 186 against the fusible link 188 (i.e., in a solid state), which maintains the spacer between the confronting ends of the split ring.

In the event the preselected temperature is reached, the fusible link material 188 melts and flows down the sides of the piston head, permitting the piston head 186 to move upward under the force exerted by the spring 202 to remove the spacer 176 from the confronting ends of the split ring, which is not shown in FIG. 6. The spring 202 is seated on a washer 204 that is held in position by a retaining clip 206 and a seal 196 which can be made from a RTV silicon rubber compound that seals water from entering the piston chamber within the housing 190. It should be note that the diameter of the piston rod 194 is reduced at a transition 198 on the piston rod adjacent the housing opening at the point in time at which the piston is just about to be moved, to allow clearance for unwanted debris during translation of the piston rod 194. It should be appreciated that while this embodiment employs a fusible link that melts at the preselected temperature, other materials that change state in other ways or become deformable may be used in place of the fusible link illustrated in this embodiment, so long as the change of state or condition of the material at the preselected temperature permits the piston head 186 to move upward a sufficient distance to withdraw the spacer 176 from the split ring. Additionally, it should also be appreciated that other types of springs may be used without departing from the scope of the claims set forth hereafter.

Figure 8:
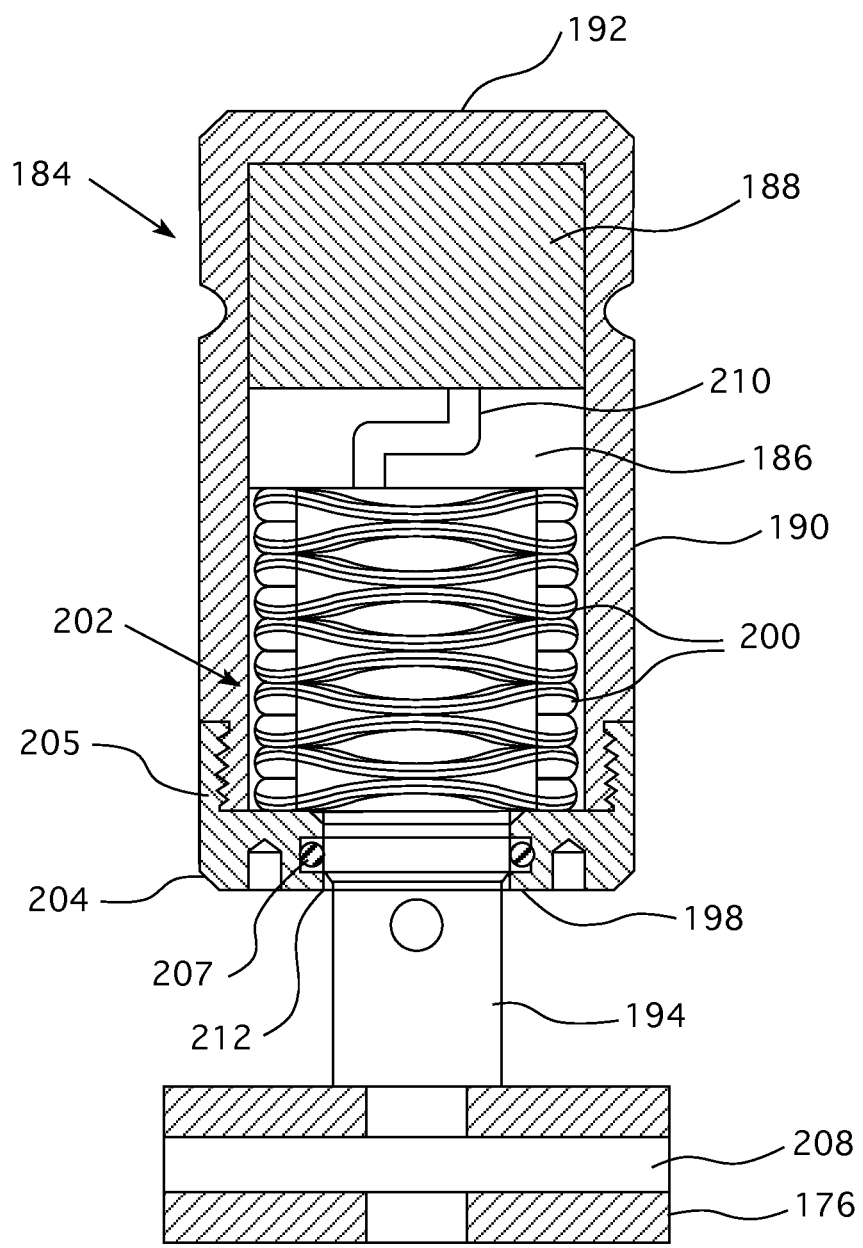
FIG. 8 is a longitudinal cross-sectional view of a second embodiment of the thermally actuated mechanical piston claimed hereafter.

FIG. 8 shows a second embodiment of the thermal actuator 184 claimed hereafter. Like reference characters are employed among the several figures to identify corresponding components. Unlike the actuator 184 shown in FIGS. 6 and 7 which has the piston 186 spaced from the inner walls of the cylinder 190 to provide room for the fusible link 188 to move past the piston head 186 as it melts to provide room for the piston to move up in the cylinder, the piston head 186 in FIG. 8 extends the full width of the interior walls of the cylinder. The piston head in FIG. 8 has a flow channel 210 that enables the fusible link to, at least in part, move past the piston as the fusible link melts or otherwise changes state. By changing state it is meant that the material that the fusible link is constructed from melts into a liquid, changes to a gas or otherwise becomes so pliable that it can pass by the piston from the upper cavity above the piston head to the lower chamber that houses the spring 202, as a result of reaching the preselected temperature.

The housing 190 of the embodiment illustrated in FIG. 8 has cylindrical walls with an integral upper end 192 closing off the top of the housing with the bottom of the housing closed off by a threaded cap 205 that is sealed by an O-ring 207 to the walls of the cylinder. The cap 205 has a central opening 212 through which the piston rod 194 passes, that is sealed with an O-ring 196 to prevent the flow of coolant into the spring chamber. In all other respects, the embodiment illustrated in FIG. 8 functions the same as the embodiment illustrated in FIGS. 6 and 7.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pump having an impeller section which is connected to a motor through a shaft that is rotatably supported between the motor and an impeller with a seal housing interposed around the shaft between the motor and the impeller section, the seal housing having a shutdown seal for surrounding the rotating shaft and preventing a fluid in an annulus surrounding the shaft from leaking past the shutdown seal after rotation of the shaft has slowed or stopped, comprising:

a constrictable split ring surrounding the shaft, the split ring having confronting ends and an inner diameter spaced from the shaft when the shaft is rotating, the inner diameter defining a portion of the annulus;

a spacer disposed between the confronting ends of the split ring for maintaining the annular space between the confronting ends during normal operation of the shaft, the spacer is operable to be removed from between the confronting ends when the fluid rises above a preselected temperature so the split ring can constrict to narrow or substantially seal the portion of the annulus;

an actuator for removing the spacer from between the confronting ends of the split ring when the fluid rises above the preselected temperature so the split ring can constrict to narrow or substantially seal the portion of the annulus, the actuator comprising:

a cylinder having an axial dimension;

a piston axially movable within the cylinder with the cylinder having an upper and a lower end which are sealed around the piston;

a piston rod extending at a lower end of the piston through a lower opening in the cylinder and having one end of the piston rod connected to the spacer;

a cavity occupying a space within an upper portion of the cylinder between the piston and an upper end of the cylinder when the spacer is disposed between the confronting ends of the split ring;

a fusible link occupying at least some of the space within the cavity between the piston and the upper end of the cylinder, the fusible link selected to deform or change state at the preselected temperature to enable the piston to move into the cavity; and a spring interposed between a lower end of the piston and the lower end of the cylinder biasing the piston against the fusible link, wherein the piston moves toward the upper end of the cylinder upon the change of state or defamation of the fusible link to remove the spacer from between the confronting ends of the split ring.

2. The pump of claim 1 wherein the spring is a wave spring.

3. The pump of claim 2 wherein the wave spring has a number of leaves which are aligned in tandem.

4. The pump of claim 1 wherein the spring is in a compressed condition when the spacer is disposed between the confronting ends of the split ring.

5. The pump of claim 1 wherein the piston rod has a reduced diameter within the vicinity of the lower opening in the cylinder at a position of the piston rod confronting the lower opening at a time just prior to a start of movement of the piston into the cavity.

6. The pump of claim 1 wherein the fusible link is made of a material having a melting point approximately between 280° F. (138° C.) and 390° F. (198° C).

7. The pump of claim 1 including a fluid passage through the piston, the passage being sized to permit fluid passage from the cavity to another side of the piston to make room for movement of the piston into the cavity, when the fusible link changes state or deforms, while preventing passage of the fusible link through the fluid passage prior to the fusible link changing state or deforming.

8. A shutdown seal for a pump having an impeller section which is connected to a motor through a shaft that is rotatably supported between the motor and an impeller with a seal housing interposed around the shaft between the motor and the impeller section, the seal housing surrounding an axial portion of the rotating shaft, the shutdown seal being configured to be supported within the seal housing for preventing a fluid in an annulus surrounding the shaft from leaking past the shutdown seal after rotation of the shaft has slowed or stopped, the shutdown seal comprising:

a constrictable split ring configured to surround the shaft, the split ring having confronting ends and an inner diameter that will be spaced from the shaft when installed in the pump and the shaft is rotating, the inner diameter defining a portion of the annulus;

a spacer disposed between the confronting ends of the split ring for maintaining the annular space between the confronting ends during normal operation of the shaft, the spacer is operable to be removed from between the confronting ends when the fluid rises above a preselected temperature so the split ring can constrict to narrow or substantially seal the portion of the annulus;

an actuator for removing the spacer from between the confronting ends of the split ring when the fluid rises above the preselected temperature so the split ring can constrict to narrow or substantially seal the portion of the annulus, the actuator comprising:

a cylinder having an axial dimension;

a piston axially movable within the cylinder with the cylinder having an upper and a lower end which is sealed around the piston;

a piston rod extending at a lower end of the piston through a lower opening in the cylinder and having one end of the piston rod connected to the spacer;

a cavity occupying a space within an upper portion of the cylinder between the piston and an upper end of the cylinder when the spacer is disposed between the confronting ends of the split ring;

a fusible link occupying at least some of the space within the cavity between the piston and the upper end of the cylinder, the fusible link selected to deform or change state at the preselected temperature to enable the piston to move into the cavity; and a spring interposed between a lower end of the piston and the lower end of the cylinder biasing the piston against the fusible link, wherein the piston moves toward the upper end of the cylinder upon the change of state or defamation of the fusible link to remove the spacer from between the confronting ends of the split ring.

9. The shutdown seal of claim 8 wherein the spring is a wave spring.

10. The shutdown seal of claim 9 wherein the wave spring has a number of leaves which are aligned in tandem.

11. The shutdown seal of claim 8 wherein the spring is in a compressed condition when the spacer is disposed between the confronting ends of the split ring.

12. The shutdown seal of claim 8 wherein the piston rod has a reduced diameter within the vicinity of lower opening in the cylinder at a position of the piston rod confronting the opening at a time just prior to a start of movement of the piston into the cavity.

13. The shutdown seal of claim 8 wherein the fusible link is made of a material having a melting point approximately between 280° F. (138° C.) and 390° F. (198° C).

14. The pump of claim 8 including a fluid passage through the piston, the passage being sized to permit fluid passage from the cavity to another side of the piston to make room for movement of the piston into the cavity, when the fusible link changes state or deforms, while preventing passage of the fusible link through the fluid passage prior to the fusible link changing state or deforming.

* * * * *